(12) United States Patent
Fox et al.

(10) Patent No.: US 10,212,196 B2
(45) Date of Patent: Feb. 19, 2019

(54) INTERFACE DISCOVERY AND AUTHENTICATION IN A NAME-BASED NETWORK

(71) Applicant: CISCO TECHNOLOGY, INC., San Jose, CA (US)

(72) Inventors: Kevin C. Fox, San Jose, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 15/072,230

(22) Filed: Mar. 16, 2016

(65) Prior Publication Data
US 2017/0272473 A1   Sep. 21, 2017

(51) Int. Cl.
H04L 29/06 (2006.01)
H04L 29/08 (2006.01)

(52) U.S. Cl.
CPC .......... H04L 65/1069 (2013.01); H04L 67/10 (2013.01)

(58) Field of Classification Search
CPC .................................................. H04L 65/1069
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Hua Fan

(57) ABSTRACT

One embodiment provides an interface discovery system that facilitates interface discovery and authentication. During operation, the system receives a message from an unregistered interface via a local interface of a link adapter. The message can include a name. If the system determines that a source identifier of the message is not configured for a channel, the system generates a control message comprising the source identifier and an identifier of the local interface and sends the control message via a transport stack of the system.

20 Claims, 8 Drawing Sheets

(56) References Cited

U.S. PATENT DOCUMENTS

| | | |
|---|---|---|
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,071,498 B2 | 6/2015 | Beser |
| 9,112,895 B1 | 8/2015 | Lin |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0033394 A1 | 2/2003 | Stine |
| 2003/0046396 A1 | 3/2003 | Richter |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |

(56) References Cited

U.S. PATENT DOCUMENTS

| | | |
|---|---|---|
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |

(56) References Cited

U.S. PATENT DOCUMENTS

| | | |
|---|---|---|
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219427 A1 | 9/2011 | Hito |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1* | 10/2013 | Zhang ................ H04L 45/306 709/217 |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0337276 A1 | 11/2014 | Iordanov |
| 2014/0365550 A1 | 12/2014 | Jang |

(56) References Cited

U.S. PATENT DOCUMENTS

| | | |
|---|---|---|
| 2015/0006896 A1 | 1/2015 | Franck |
| 2015/0018770 A1 | 1/2015 | Baran |
| 2015/0032892 A1 | 1/2015 | Narayanan |
| 2015/0039890 A1 | 2/2015 | Khosravi |
| 2015/0063802 A1 | 3/2015 | Bahadur |
| 2015/0089037 A1* | 3/2015 | Tsirkin .................. H04L 12/46 709/223 |
| 2015/0089081 A1 | 3/2015 | Thubert |
| 2015/0095481 A1 | 4/2015 | Ohnishi |
| 2015/0095514 A1 | 4/2015 | Yu |
| 2015/0113163 A1 | 4/2015 | Jacobson et al. |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2928117 A1 | 10/2015 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

Detti et al., "Supporting the Web with an information centric network that routes by name", Aug. 2012, Computer Networks 56, pp. 3705-3702.

Garcia-Luna-Aceves et al., "Automatic Routing Using Multiple Prefix Labels", 2012, IEEE, Ad Hoc and Sensor Networking Symposium.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

Soh et al., "Efficient Prefix Updates for IP Router Using Lexicographic Ordering and Updateable Address Set", Jan. 2008, IEEE Transactions on Computers, vol. 57, No. 1.

V. Jacobson et al., 'Networking Named Content,' Proc. IEEE CoNEXT '09, Dec. 2009.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library-Pairing-Based Cryptography-About," http://crypto.stanford.edu/pbc. downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

Hoque et al., "NLSR: Named-data Link State Routing Protocol", Aug. 12, 2013, ICN'13.

D. Boneh and M. Franklin. Identity-Based Encryption from the Weil Pairing. Advances in Cryptology—CRYPTO 2001, vol. 2139, Springer Berlin Heidelberg (2001).

Anteniese et al., "Improved Proxy Re-Encryption Schemes with Applications to Secure Distributed Storage", 2006.

Xiong et al., "CloudSeal: End-to-End Content Protection in Cloud-based Storage and Delivery Services", 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digit.

J. Shao and Z. Cao. CCA-Secure Proxy Re-Encryption without Pairings. Public Key Cryptography. Springer Lecture Notes in Computer Sciencevol. 5443 (2009).

Gopal et al. "Integrating content-based Mechanisms with hierarchical File systems", Feb. 1999, University of Arizona, 15 pages.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

(56) References Cited

OTHER PUBLICATIONS

"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

(56) References Cited

OTHER PUBLICATIONS

Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans. on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.

(56) References Cited

OTHER PUBLICATIONS

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014}: 66-73.

D. Trossen and G. Parisis, "Designing and realizing and information-centric internet," IEEE Communications Magazing, vol. 50, No. 7, pp. 60-67, Jul. 2012.

Gasti, Paolo et al., 'DoS & DDoS in Named Data Networking', 2013 22nd International Conference on Computer Communications and Networks (ICCCN), Aug. 2013, pp. 1-7.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., 'NLSR: Named-data Link State Routing Protocol', Aug. 12, 2013, ICN 2013, pp. 15-20.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content—Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

International Search Report and Written Opinion in corresponding International Application No. PCT/US2017/021652, dated May 8, 2017, 8 pages.

* cited by examiner

INTERFACE DISCOVERY AND AUTHENTICATION IN A NAME-BASED NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/595,060, entitled "AUTO-CONFIGURABLE TRANSPORT STACK," by inventors Ignacio Solis and Glenn C. Scott, filed 12 Jan. 2015 (hereinafter "U.S. patent application Ser. No. 14/595,060"); the disclosures of which are herein incorporated by reference in their entirety.

BACKGROUND

Field

This disclosure is generally related to the distribution of digital content. More specifically, this disclosure is related to channel discovery and authentication based on a name-based message-exchange.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified by their unique names, which are typically hierarchically structured variable-length identifiers (HSVLI). An HSVLI can include contiguous name components ordered from a most general level to a most specific level.

A CCN node typically does not accept unsolicited messages in order to prevent potential attacks and minimize their impact. However, in a CCN network, all nodes may not be coordinated to establish communication channels among themselves for message exchanges. As a result, a forwarder of a node can receive a message via a remote interface (i.e., the interface of a remote node in the CCN network) that has not been configured with a channel. Since the remote interface is "unknown" to the forwarder, it drops the received message. This can lead to a forwarder dropping a valid message from a peer node.

SUMMARY

One embodiment provides an interface discovery system that facilitates interface discovery and authentication. During operation, the system receives a message from an unregistered interface via a local interface of a link adapter. The message can include a name. If the system determines that a source identifier of the message is not configured for a channel, the system generates a control message comprising the source identifier and an identifier of the local interface and sends the control message via a transport stack of the system.

In a variation on this embodiment, the system discards the message at the link adapter, authenticates the source identifier, and configures a channel with the source identifier.

In a variation on this embodiment, the message is based on one or more of: a hierarchically structured variable-length identifier (HSVLI), which comprises contiguous name components ordered from a most general level to a most specific level. The HSVLI is applicable in a portal instance corresponding to the stack; a flat name that does not indicate any hierarchy; a role of the component within the stack; and a unique identifier, which is specific to the component of the stack.

In a variation on this embodiment, the system logs the contents of the control message in an activity log of the node.

In a further variation, the system receives an administrative command based on the activity log. The administrative command includes authenticating the source identifier and configuring a channel with the source identifier.

In a variation on this embodiment, the message is a request for establishing a tunnel as a channel. The system then authenticates a tunnel between the local interface and the unregistered interface, and configures the tunnel as a channel.

In a variation on this embodiment, the source identifier is one or more of: a media access control (MAC) address, an Internet Protocol (IP) address, a network label, and a name.

BRIEF DESCRIPTION OF THE FIGURES

In the figures, like reference numerals refer to the same figure elements.

DETAILED DESCRIPTION

Figure 1A:
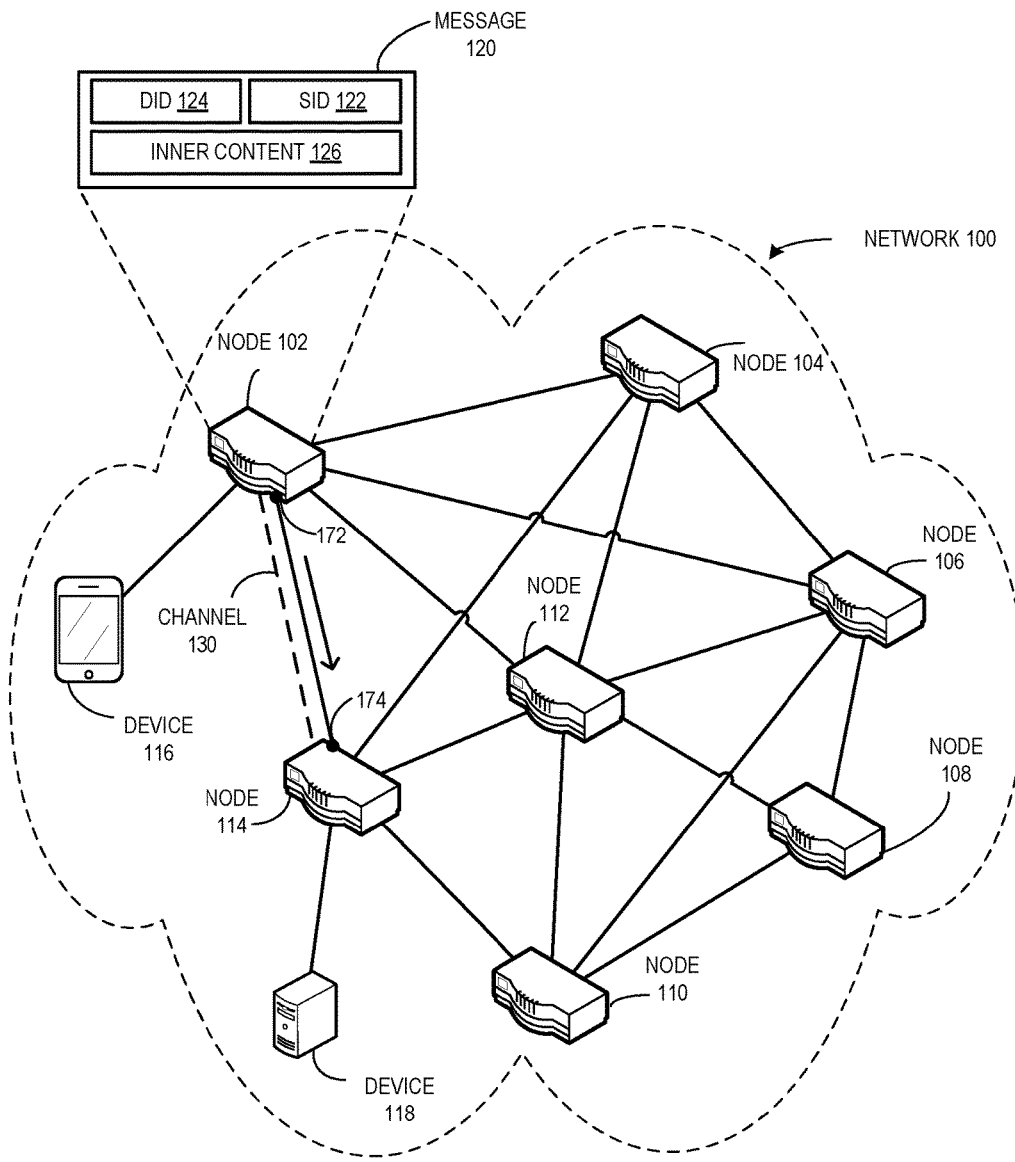
FIG. 1A illustrates an exemplary content-centric network (CCN) that facilitates interface discovery and authentication, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of processing an unsolicited message from an unregistered interface by facilitating discovery and authentication of the interface based on the unsolicited message. During operation, when a CCN node receives the unsolicited message from an unregistered interface (e.g., a message with an unknown source identifier), the receiving interface (e.g., the receiving link adapter) of the node drops the message and sends a control message via the transport stack of the node. The control message can include the unknown source identifier and an identifier of the receiving interface. The routing agent of the node receives the control message, authenticates the unregistered interface, and sets up a new channel with that interface. This allows the node to create routing table and pending interest table (PIT) entries. The routing agent can also log the information of the control message so that an administrative action can be taken.

In some embodiments, the authentication can require an administrative action. The routing agent then logs the arrival of the message along with the information of the control message in an activity log of the receiving node. This log entry can create an alarm for an administrator for an administrative action. In either case, a peer node can solicit a new connection without requiring a higher level coordination protocol. The unsolicited message can be used as the request to initiate a communication. Furthermore, when the node determines that the unsolicited message is an unexpected message, the node creates an entry in the activity log and generates an alert to invoke actions against potential intrusion or denial-of-service attacks.

In CCN, a transport framework enables a transport stack within the framework. The transport stack can include multiple components or communication modules, and does not adhere to a traditional layered model (e.g., OSI) where each component communicates only with the component below or above it. The transport stack can be created dynamically and configured at runtime, where each of the components within the transport stack performs a specific function. For example, one component of the transport stack can be a verifier component, which is responsible for verifying the digital signature of content objects received in response to an interest sent over the network.

In some embodiments, the transport framework operates under the CCN architecture. In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location-independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish among different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In addition, "lci" refers to labeled content information and is a Universal Resource Indicator (URI) compliant identifier in which name segments carry a label. Network protocols such as CCN can use labeled content information by applying specific labels to each name segment of a URI. In a hierarchically structured name, a labeled content name assigns a semantic type or label to each segment. For example, a type of name segment can include a name segment, which is a generic name segment that includes arbitrary octets, which allows a CCN to use a binary on-the-wire representation for messages.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary content-centric network (CCN) that facilitates interface discovery and authentication, in accordance with an embodiment of the present invention. A network 100, which can be a CCN, can include a client device 116, a content producing device 118, and a router or other forwarding device at nodes 102, 104, 106, 108, 110, 112, and 114. A node can be a computer system, an endpoint representing users, and/or a device that can generate interests or originate content. In a CCN network, the interfaces (e.g., on a transport link adapter) are often configured based on configuration files comprising prepared configuration specifications. The configuration of these interfaces is usually modified by explicit administrative commands at runtime.

Suppose that peer nodes 102 and 114 are coupled to each other via interface 172 of node 102 and interface 174 of node 114. If nodes 102 and 114 do not have a configured channel between interfaces 172 and 174, nodes 102 and 114 may remain unaware of the interface of the peer node. As a result, node 114 can receive a message from interface 172, which has not been registered at node 114. Typically, when the receiving link adapter determines that it has received an unsolicited message from an unregistered interface, the link adapter drops the message. However, this can lead to loss of valid messages.

To solve this problem, embodiments of the present invention notify the control agent regarding the arrival of an unsolicited message. During operation, node 102 sends a message 120 via interface 172 to node 114. Message 120 can include a source identifier 122 and a destination identifier 124. Message 120 can also include inner content 126, which can be a content object or an interest. The source and destination identifiers can be: a media access control (MAC) address, an Internet Protocol (IP) address, a network label, a name, and a combination thereof. Suppose that identifiers 122 and 124 are assigned to interfaces 172 and 174, respectively.

Since message 120 is an unsolicited message from unregistered interface 172, source identifier 122 is an unknown identifier to node 114. Upon receiving message 120, the link adapter (e.g., the receiving link adapter) of node 114 determines that destination identifier 124 is assigned to a local interface 174 and, hence, message 120 is destined to node 114. The link adapter further determines that source identifier 122 is an unknown identifier from an unregistered interface. The link adapter notifies the routing agent of node 114 regarding the arrival of message 120. To do so, the link adapter drops message 120 and sends a control message to the routing agent. The control message can include source identifier 122 and an interface identifier of receiving interface 174. The interface identifier can be an internal and local identifier of node 114, or identifier 124.

The routing agent of the node receives the control message and authenticates unregistered interface 172. In some embodiments, node 114 can include an authentication module, which authenticates unregistered interface 172 and its identifier 122. This allows the routing agent to set up a new channel 130 between interfaces 172 and 174. As a result, the routing agent creates corresponding routing table entries. For any subsequent message with an interest received from node 102, node 114 creates a PIT entry, thereby allowing data forwarding between interfaces 172 and 174. In some embodiments, the authentication can require an administrative action. The routing agent then logs the arrival of message 120 along with the information of the control message in an activity log of node 114. This log entry can create an alarm for an administrator for an administrative action.

In this way, peer node 102 can solicit a new connection with node 114 without requiring a higher level coordination protocol. Unsolicited message 120 can be used as the request to initiate a communication. Furthermore, when node 114 determines that unsolicited message 120 is an unexpected message, node 114 can create an entry in the activity log and generate an alert to invoke actions against potential intrusion or denial-of-service attacks.

Figure 1B:
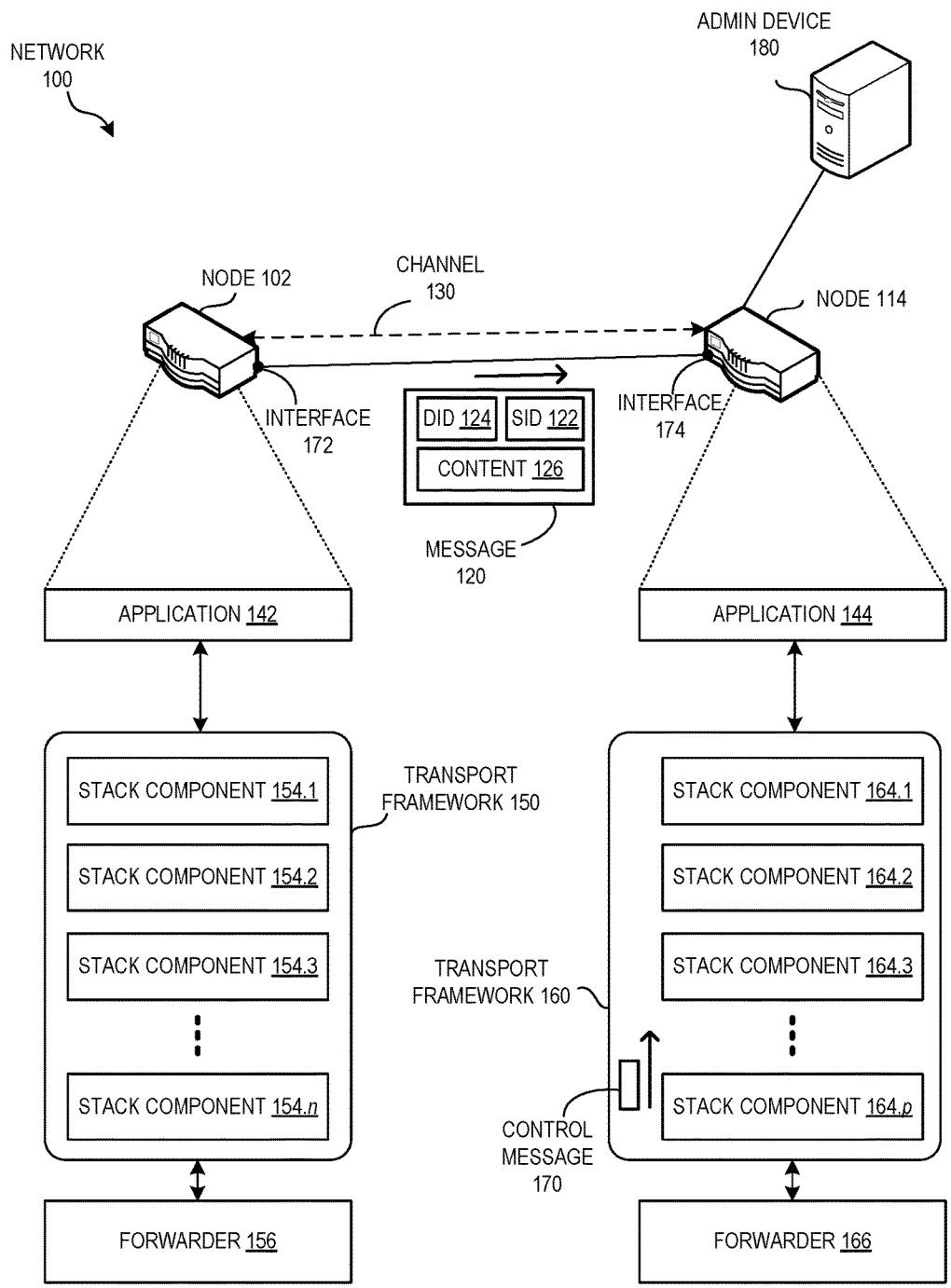
FIG. 1B illustrates an exemplary transport framework for facilitating interface discovery and authentication, in accordance with an embodiment of the present invention.

FIG. 1B illustrates an exemplary transport framework for facilitating interface discovery and authentication, in accordance with an embodiment of the present invention. In this example, nodes 102 and 114 can have internal transport stacks (e.g., associated with transport frameworks 150 and 160, respectively) that exchange network packets with each other over network 100. In a traditional IP architecture, a forwarder is an IP-based forwarder that looks at the header of a packet to determine the source and the destination for the packet, and forwards the packet to the destination. The stack performs TCP/UDP, and an application interacts with the stack via a socket. In contrast, node 102 (or node 114) of the present invention does not use a conventional "stack." Rather, an application 142 running on node 102 can communicate with any stack components of transport framework 150. Similarly, an application 144 running on node 114 can communicate with any stack components of transport framework 160.

Transport framework 150 of node 102 can include stack components 154.1-154.n. Node 102 can also include forwarder 156, (e.g., a network interface card, or a router in a local area network), which can transfer packets to and from the stack (and individual stack components) of transport framework 150 via network 100. Similarly, transport framework 160 of node 114 can include stack components 164.1-164.p. Node 114 can also include a forwarder 166, which can transfer packets to and from the stack (and individual stack components) of transport framework 160 via network 100. Forwarders 156 and 166 can also facilitate the transfer of packets directly between individual stack components 154.1-154.n and 164.1-164.p, respectively.

In some embodiments, a stack component of transport framework 150 operates as a routing agent, which creates and maintains a forwarding information base (FIB) for node 102. Similarly, a stack component of transport framework 160 can operate as a routing agent for node 114. When node 114 receives message 120, the link adapter inspects source identifier 122 to determine which of the link adapter's currently configured channels should receive the message. Since source identifier 122 does not match any current configuration, the link adapter drops message 120 and sends a control message 170 up the transport stack of transport framework 160 to the stack component operating as the routing agent. Control message 170 can include source identifier 122 and an interface identifier of receiving interface 174.

Another stack component of transport framework 160 can operate as an authenticator for node 114. The routing agent can authenticate source identifier 122, either within itself or in conjunction with the authenticator, for any future communication and sets up a new channel 130. In addition, the authentication can require an administrative action. The routing agent or the authenticator then logs the arrival of message 120 along with the information of the control message in an activity log of node 114. This log entry can create an alarm in an administrative device 180, which can access a command interface of node 114. Based on the alert, an administrator can configure channel 130 between interfaces 172 and 174 via the command interface (e.g., a command line interface (CLI) or a graphical user interface (GUI)).

Unsolicited Tunnel Request

Figure 2:
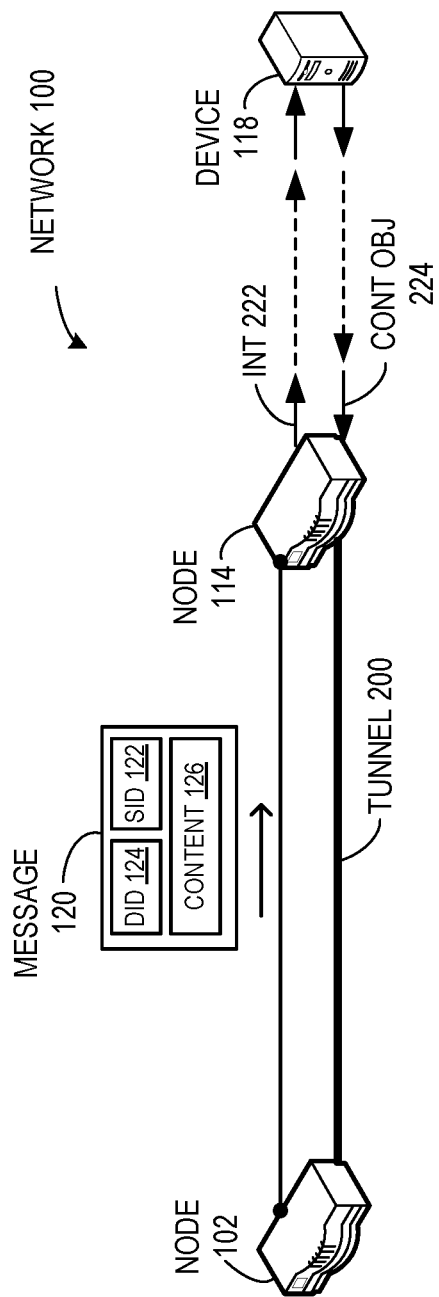
FIG. 2 illustrates an exemplary tunnel establishment based on interface discovery and authentication, in accordance with an embodiment of the present invention.

FIG. 2 illustrates an exemplary tunnel establishment based on interface discovery and authentication, in accordance with an embodiment of the present invention. In this example, node 102 sends message 120 to node 114 to establish a tunnel as a channel with node 114. The tunnel can be a Transmission Control Protocol (TCP) or a User Datagram Protocol (UDP) tunnel. Based on the request, node 114 can authenticate the requested tunnel and initiate a tunnel establishment protocol to establish tunnel 200. For example, content 126 of message 120 can be a tunnel-specific name, which can further include tunnel configuration parameters.

In response, node 114 can send encryption parameters and other necessary information to establish a tunnel to node 102. Based on the exchanged information, nodes 102 and 114 can establish a tunnel 200. Upon establishing tunnel 200, node 114 can configure tunnel 200 as a channel with node 102. In some embodiments, the authentication can require an administrative action. Node 114 then logs the arrival of message 120 along with its associated information in an activity log of node 114. This log entry can create an alarm for an administrator for an administrative action. An administrator can then configure tunnel 200 as a channel between nodes 102 and 114.

In some embodiments, upon establishing the channel (e.g., either as a tunnel or as a configured channel, as described in conjunction with FIG. 1A), node 114 can take further actions on content 126 of message 120 instead of discarding message 120. For example, if content 126 includes an inner interest 222, node 114 can create an entry in a local PIT. Subsequently, node 114 can transmit interest 222 through network 100. Suppose that interest 222 can be satisfied by device 118 in network 100. Here, device 118 can operate as a producer. Upon receiving interest 222, device 118 transmits a responsive content object 224 to node 114. Node 114 receives content object 224, looks up in the local PIT the interest name matching the name of content object 224, and finds the matching PIT entry. Node 114 can then repackage a content object 224 to include the tunnel-specific information and transmit content object 224 via tunnel 200 back to node 102.

Operations

Figure 3A:
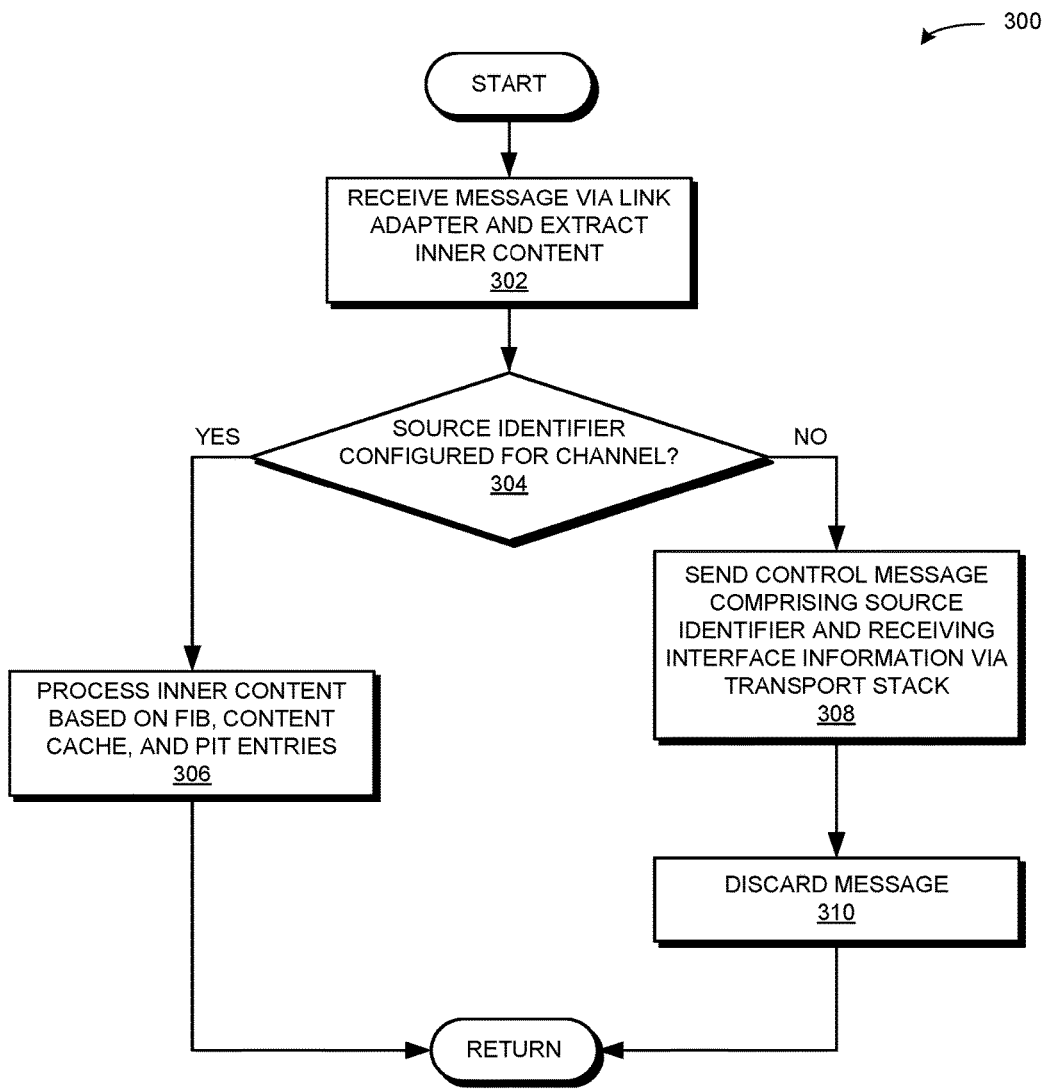
FIG. 3A presents a flow chart illustrating a method for processing a message from an unregistered interface, in accordance with an embodiment of the present invention.

FIG. 3A presents a flow chart 300 illustrating a method for processing a message from an unregistered interface, in accordance with an embodiment of the present invention. During operation, a CCN node receives a message via a local link adapter and extracts the inner content (operation 302). The link adapter then checks whether the source identifier of the message is configured for a channel (operation 304). If the source identifier is configured for a channel (i.e., the source identifier is known to the node), the inner content is processed by the node based on its FIB, content cache, and PIT entries (operation 306). If the source identifier has not been configured for a channel, the link adapter sends a control message comprising a source identifier and receiving interface information (e.g., an interface identifier) via the transport stack of the node (operation 308). The link adapter can also discard the message (operation 310).

Figure 3B:
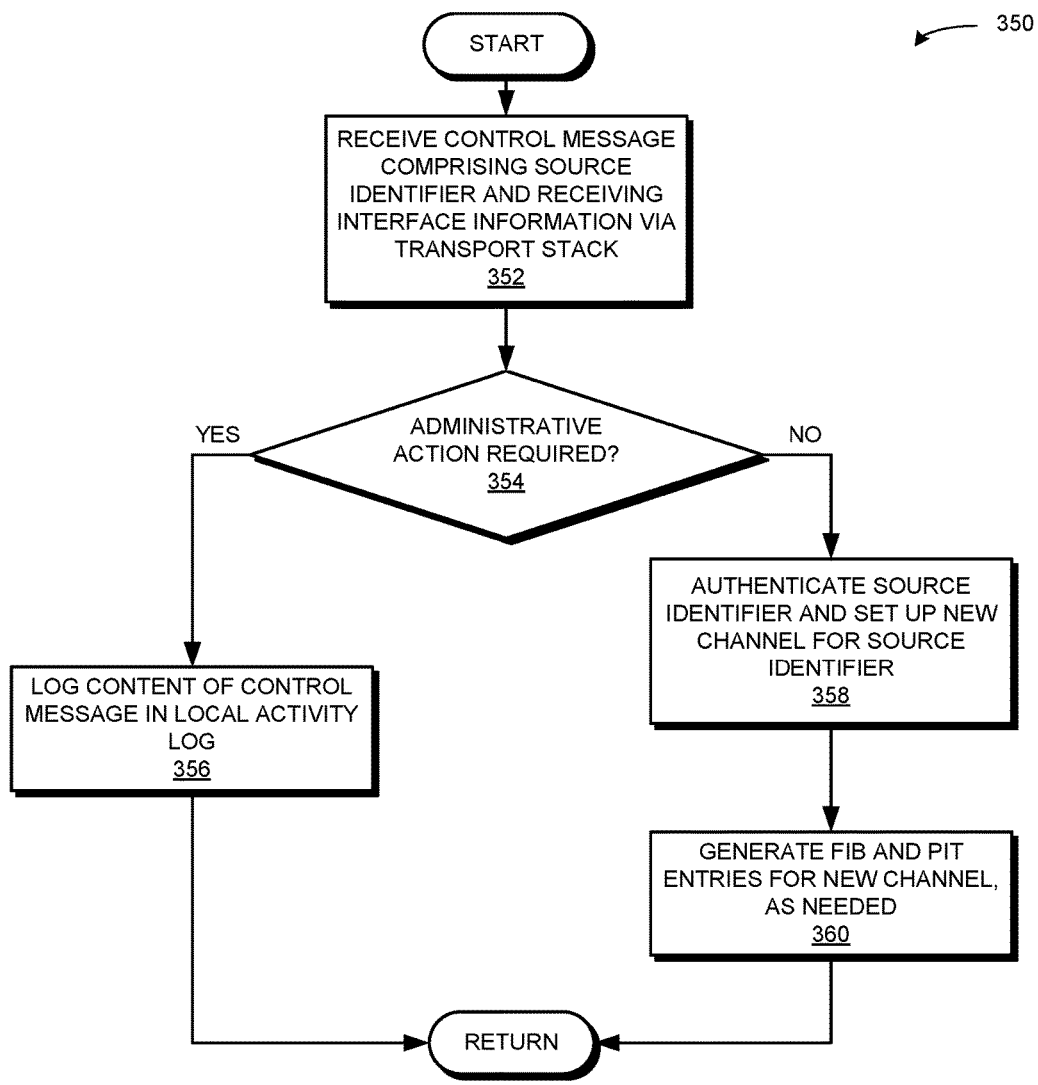
FIG. 3B presents a flow chart illustrating a method for processing a control message identifying an unregistered interface, in accordance with an embodiment of the present invention.

FIG. 3B presents a flow chart 350 illustrating a method for processing a control message identifying an unregistered interface, in accordance with an embodiment of the present invention. During operation, the routing agent of a CCN node receives a control message comprising a source identifier and receiving interface information (e.g., an interface identifier) via the transport stack of the node (operation 352). The source identifier can be: a media access control (MAC) address, an Internet Protocol (IP) address, a network label, a name, and a combination thereof. The routing agent then checks whether an administrative action is required for the control message (operation 354).

If an administrative action is required, the routing agent logs the content of the control message in a local activity log (operation 356). This causes an alert to an administrative device. If an administrative action is not required, the routing agent authenticates the source identifier and sets up a new channel for the source identifier (operation 358). The routing agent can operate in conjunction with an authenticator to authenticate the source identifier. The routing agent then creates FIB entries for the new channel, as needed (operation 360). The node can also create PIT entries for the interests received via the new channel.

Figure 4:
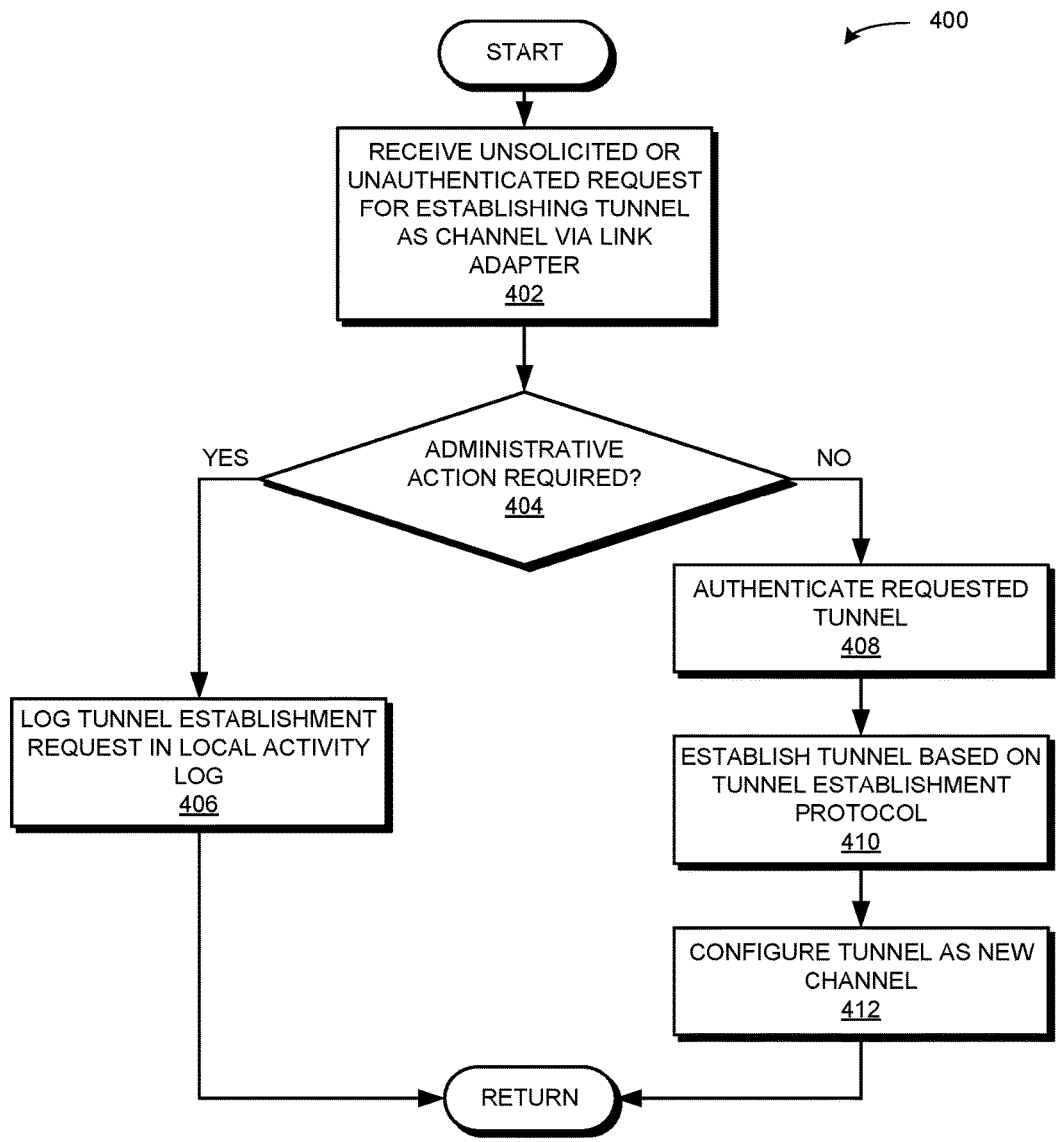
FIG. 4 presents a flow chart illustrating a method for processing an unsolicited or unauthenticated request for a tunnel, in accordance with an embodiment of the present invention.

FIG. 4 presents a flow chart 400 illustrating a method for processing an unsolicited or unauthenticated request for a tunnel, in accordance with an embodiment of the present invention. During operation, a CCN node receives an unsolicited or unauthenticated request for establishing a tunnel as a channel via a link adapter (operation 402). The link adapter then checks whether an administrative action is required for the request (operation 404). If an administrative action is required, the node logs the tunnel establishment request in a local activity log (operation 406). This causes an alert to an administrative device. If an administrative action is not required, the node authenticates the requested tunnel (operation 408). The node establishes the tunnel based on a tunnel establishment protocol (operation 410) and configures the tunnel as a new channel (operation 412).

Exemplary Apparatus and Computer System

Figure 5:
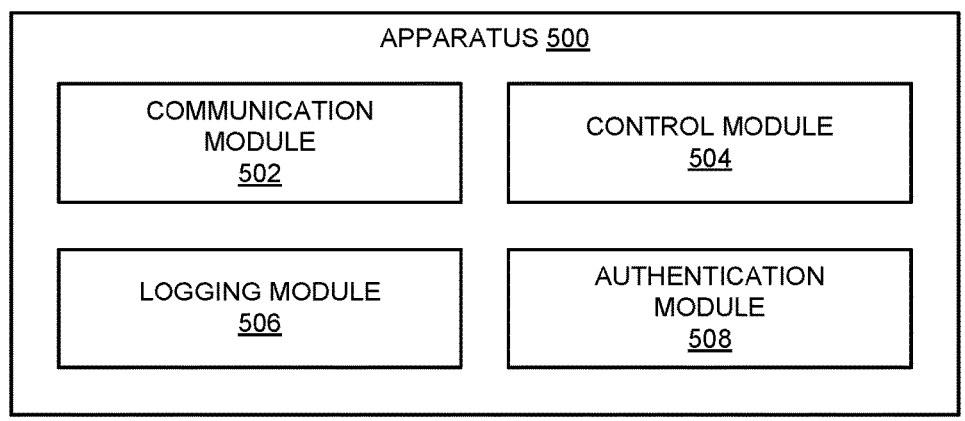
FIG. 5 illustrates an exemplary apparatus that facilitates interface discovery and authentication, in accordance with an embodiment of the present invention.

FIG. 5 illustrates an exemplary apparatus that facilitates interface discovery and authentication, in accordance with an embodiment of the present invention. Apparatus 500 can comprise a plurality of modules, which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device that is capable of communicating with other computer systems and/or devices. Specifically, apparatus 500 can comprise a communication module 502, a control module 504, a logging module 506, and an authentication module 508.

In some embodiments, communication module 502 can send and/or receive data packets to/from other network nodes across a computer network, such as a content-centric network. Communication module 502 can receive an unsolicited message from an unregistered interface. Control module 504 can send a control message up the transport stack comprising a source identifier and the receiving interface information of the unsolicited message. Logging module 506 logs the arrival of the message along with the information of the control message in a local activity log. Authentication module 508 authenticates the unregistered interface and sets up a new channel with that interface. This allows apparatus 500 to create routing table (e.g., FIB) and PIT entries.

Figure 6:
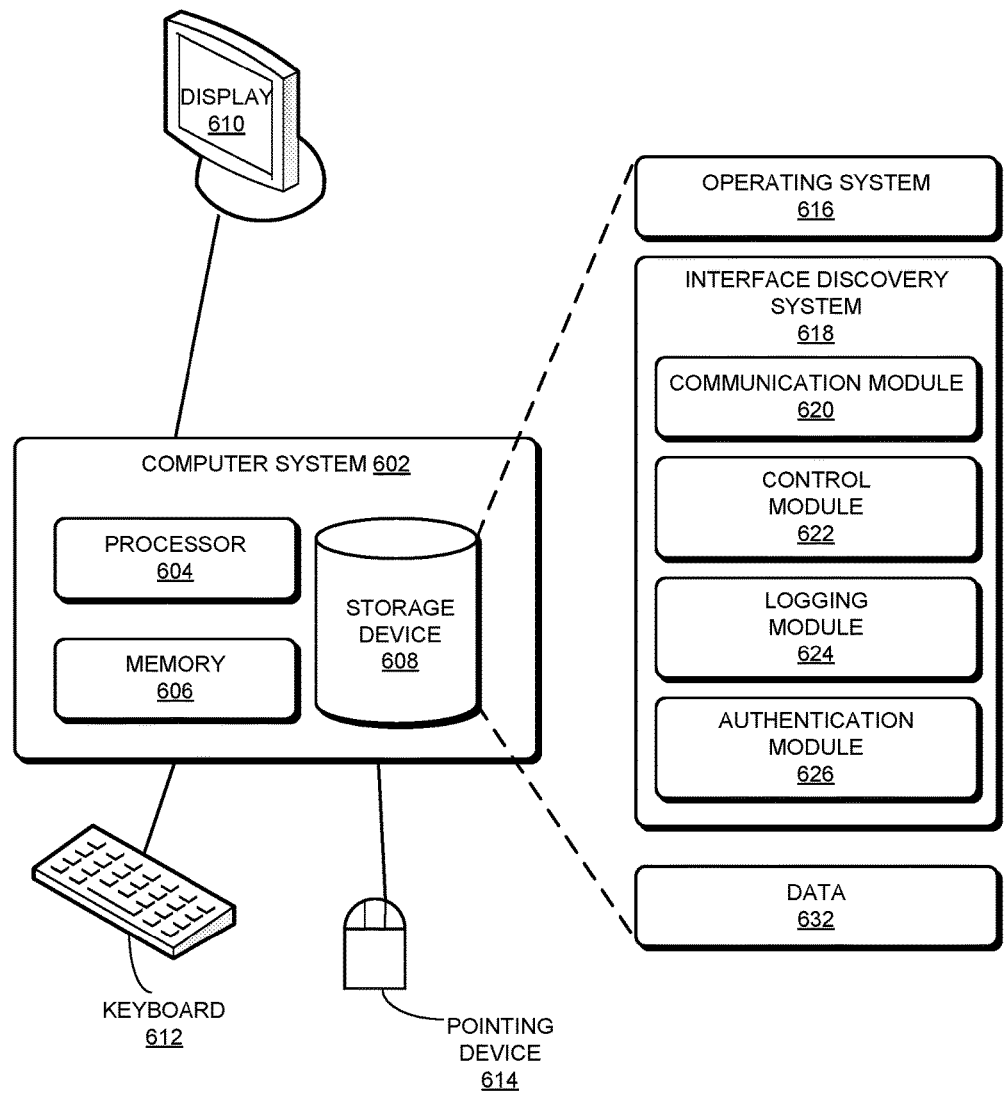
FIG. 6 illustrates an exemplary computer system that facilitates interface discovery and authentication, in accordance with an embodiment of the present invention.

FIG. 6 illustrates an exemplary computer system that facilitates interface discovery and authentication, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, an interface discovery system 618, and data 632.

Interface discovery system 618 can include instructions, which when executed by computer system 602, can cause computer system 602 to perform methods and/or processes described in this disclosure. Specifically, interface discovery system 618 may include instructions for sending and/or receiving data packets to/from other network nodes across a computer network, such as a content-centric network (communication module 620). Further, interface discovery system 618 may include instructions for receiving and identifying an unsolicited message from an unregistered interface (communication module 620).

Interface discovery system 618 can include instructions for sending a control message up the transport stack comprising a source identifier and the receiving interface information of the unsolicited message (control module 622). Interface discovery system 618 can also include instructions for logging the arrival of the message along with the information of the control message in a local activity log (logging module 624). In addition, interface discovery system 618 can include instructions for authenticating the unregistered interface and sets up a new channel with that interface (authentication module 626).

Data 632 can include any data that is required as input or that is generated as output by the methods and/or processes described in this disclosure. Specifically, data 632 can store at least a packet that corresponds to an interest, where the interest includes a name; a transport framework; a protocol or transport stack; one or more components of a transport or protocol stack; authentication information; and the activity log of computer system 602.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   receiving, by a local interface of a link adapter of a node, a message from an unregistered interface, wherein the message includes a name, a source identifier indicating the unregistered interface, and a destination identifier indicating a destination interface for the message;
   determining whether the destination identifier is assigned to the local interface;
   determining whether the source identifier is known to the link adapter; and
   in response to determining that the destination identifier is assigned to the local interface and the source identifier is unknown to the link adapter:
      discarding the message at the link adapter;
      generating a control message comprising the source identifier and an identifier of the local interface; and
      sending the control message via a transport stack of the node to configure a channel with the source identifier.

2. The method of claim 1, further comprising:
   authenticating the source identifier; and
   configuring the channel between the local interface and the unregistered interface associated with the source identifier.

3. The method of claim 1, wherein the name in the message is based on one or more of:
   a hierarchically structured variable-length identifier (HSVLI), which comprises contiguous name components ordered from a most general level to a most specific level, wherein the HSVLI is applicable in a portal instance corresponding to the stack;
   a flat name that does not indicate any hierarchy;
   a role of a component of the stack; and
   a unique identifier, which is specific to the component of the stack.

4. The method of claim 1, further comprising logging contents of the control message in an activity log of the node.

5. The method of claim 4, further comprising receiving an administrative command based on the activity log, wherein the administrative command includes authenticating the source identifier and configuring the channel with the source identifier.

6. The method of claim 1, wherein the message is a request for establishing a tunnel as the channel;
   wherein the method further comprises:
      authenticating a tunnel between the local interface and the unregistered interface; and
      configuring the tunnel as the channel.

7. The method of claim 1, wherein the source identifier is one or more of: a media access control (MAC) address, an Internet Protocol (IP) address, a network label, and a name.

8. A non-transitory computer-readable storage medium storing instructions that when executed by a computer cause the computer to perform a method, the method comprising:
   receiving, by a local interface of a link adapter of a node, a message from an unregistered interface, wherein the message includes a name, a source identifier indicating the unregistered interface, and a destination identifier indicating a destination interface for the message;
   determining whether the destination identifier is assigned to the local interface;
   determining whether the source identifier is known to the link adapter; and
   in response to determining that the destination identifier is assigned to the local interface and the source identifier is unknown to the link adapter:

discarding the message at the link adapter;
generating a control message comprising the source identifier and an identifier of the local interface; and
sending the control message via a transport stack of the node to configure a channel with the source identifier.

9. The storage medium of claim 8, wherein the method further comprises:
authenticating the source identifier; and
configuring the channel between the local interface and the unregistered interface associated with the source identifier.

10. The storage medium of claim 8, wherein the name in the message is based on one or more of:
a hierarchically structured variable-length identifier (HS-VLI), which comprises contiguous name components ordered from a most general level to a most specific level, wherein the HSVLI is applicable in a portal instance corresponding to the stack;
a flat name that does not indicate any hierarchy;
a role of a component of the stack; and
a unique identifier, which is specific to the component of the stack.

11. The storage medium of claim 8, wherein the method further comprises logging contents of the control message in an activity log of the node.

12. The storage medium of claim 11, wherein the method further comprises receiving an administrative command based on the activity log, wherein the administrative command includes authenticating the source identifier and configuring the channel with the source identifier.

13. The storage medium of claim 8, wherein the message is a request for establishing a tunnel as the channel;
wherein the method further comprises:
authenticating a tunnel between the local interface and the unregistered interface; and
configuring the tunnel as the channel.

14. The storage medium of claim 8, wherein the source identifier is one or more of: a media access control (MAC) address, an Internet Protocol (IP) address, a network label, and a name.

15. A computer system for facilitating forwarding of packets, the system comprising:
a processor; and
a storage device storing instructions that when executed by the processor cause the processor to perform a method, the method comprising:
receiving, by a local interface of a link adapter of a node, a message from an unregistered interface, wherein the message includes a name, a source identifier indicating the unregistered interface, and a destination identifier indicating a destination interface for the message;
determining whether the destination identifier is assigned to the local interface;
determining whether the source identifier is known to the link adapter; and
in response to determining that the destination identifier is assigned to the local interface and the source identifier is unknown to the link adapter:
discarding the message at the link adapter;
generating a control message comprising the source identifier and an identifier of the local interface; and
sending the control message via a transport stack of the node to configure a channel with the source identifier.

16. The computer system of claim 15, wherein the method further comprises:
authenticating the source identifier; and
configuring the channel between the local interface and the unregistered interface associated with the source identifier.

17. The computer system of claim 15, wherein the name in the message is based on one or more of:
a hierarchically structured variable-length identifier (HS-VLI), which comprises contiguous name components ordered from a most general level to a most specific level, wherein the HSVLI is applicable in a portal instance corresponding to the stack;
a flat name that does not indicate any hierarchy;
a role of a component of the stack; and
a unique identifier, which is specific to the component of the stack.

18. The computer system of claim 15, wherein the method further comprises logging contents of the control message in an activity log of the node.

19. The computer system of claim 18, wherein the method further comprises receiving an administrative command based on the activity log, wherein the administrative command includes authenticating the source identifier and configuring the channel with the source identifier.

20. The computer system of claim 15, wherein the message is a request for establishing a tunnel as the channel;
wherein the method further comprises:
authenticating a tunnel between the local interface and the unregistered interface; and
configuring the tunnel as the channel.

* * * * *